United States Patent
Huang

(10) Patent No.: US 7,756,220 B2
(45) Date of Patent: Jul. 13, 2010

(54) CIRCUIT AND METHOD FOR BASELINE WANDERING COMPENSATION

(75) Inventor: Kai Huang, Keelung (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 579 days.

(21) Appl. No.: 11/757,570

(22) Filed: Jun. 4, 2007

(65) Prior Publication Data

US 2008/0298475 A1    Dec. 4, 2008

(51) Int. Cl.
*H04L 25/06* (2006.01)
(52) U.S. Cl. .................................... 375/317
(58) Field of Classification Search ......... 375/232–233, 375/317, 346, 350
See application file for complete search history.

(56) References Cited

U.S. PATENT DOCUMENTS

| 6,614,842 B1 * | 9/2003 | Chou et al. ............... 375/232 |
| 6,980,644 B1 * | 12/2005 | Sallaway et al. ........... 379/391 |
| 2007/0286315 A1 * | 12/2007 | Hong et al. ............... 375/345 |

* cited by examiner

*Primary Examiner*—Khanh C Tran
(74) *Attorney, Agent, or Firm*—Winston Hsu

(57) ABSTRACT

A circuit and a method for baseline wandering compensation for solving the problem of baseline wandering in receivers of a communication system are provided. Two paths of baseline wandering compensation are provided on the basis of a slicer error. One of the paths adjusts a direct current (DC) bias of an input signal, and the other path adjusts the determining levels of the slicer, and thus, the present invention avoids input saturation of an analog-to-digital converter, enhances the signal-to-noise ratio, and achieves a precise baseline wandering compensation.

18 Claims, 4 Drawing Sheets

CIRCUIT AND METHOD FOR BASELINE WANDERING COMPENSATION

BACKGROUND OF THE INVENTION

1. Field of the Invention

The present invention relates to a circuit and a method for baseline wandering compensation. More particularly, the present invention relates to a circuit and a method for baseline wandering compensation that uses a baseline corrector to adjust a baseline wandering compensation.

2. Description of Related Art

When data are transmitted in channels, low-frequency signals are often generated due to the imbalance between positive and negative signals. Moreover, as the currently-used transformer is not perfect, it cannot only filter out DC signals, signals at lower frequencies are distorted, and thus a DC bias occurs. Thus, the linearity and the signal-to-noise ratio (SNR) are reduced, or in another aspect, input signals exceed the allowed swing range of an analog-to-digital converter (ADC), which causes ADC saturation. The above phenomenon is defined as baseline wandering.

In general, two methods are mainly used for the baseline wandering compensation. FIG. 1 shows a first baseline wandering compensation method. Referring to FIG. 1, this method mainly uses a feedback control to adjust a DC bias of a front end signal BX that enters an ADC 102. The circuit of FIG. 1 includes an analog signal processor S110 and a digital signal processor S120. The analog signal BX is converted to a digital signal DX by the ADC 102, and then, an equalizer 103 eliminates the channel effect of the digital signal DX, and outputs a signal EX to a slicer 104. The digital signal processor S120 is mainly used to utilize the slicer 104 to recover the output signal EX of the equalizer 103 to original state values (e.g., MLT-3 encoded −1, 0, and 1) when the output signal EX was sent out from a sending terminal. A baseline corrector 105 calculates an error SX before and after the recovery, i.e., the error before and after the signal EX passes through the slicer 104, and outputs the error SX as a compensation CX to a digital-to-analog converter (DAC) 106. The DAC 106 converts the compensation CX from a digital signal to an analog signal AX, and a baseline compensator 101 uses the analog compensation AX to adjust a DC bias of an input signal RX.

The method of FIG. 1 has an advantage that, as the input signal RX is compensated before entering the ADC 102, and thus the input saturation of the ADC 102 is avoided. However, the disadvantage of the method of FIG. 1 lies in that, the precision of the compensation CX is limited by number of bits of the DAC 106 and the ADC 102, so precise compensation cannot be achieved if the baseline wandering is relatively small.

FIG. 2 shows a second baseline wandering compensation method. Referring to FIG. 2, the circuit of FIG. 2 includes an analog signal processor S210 and a digital signal processor S220. This method mainly aims at adjusting a determining level of a slicer 203 at the digital signal processor S220, so as to compensate the baseline wandering precisely and timely. In the digital signal processor S220, an equalizer 202 receives a digitalized signal DY output from an ADC 201, and then eliminates the channel effect of the signal DY and outputs a signal EY Then, a feedback circuit is disposed, in which the slicer 203 adjusts the determining level of the slicer 203 according to a compensation signal CY of a baseline corrector 204, so as to determine the state value corresponding to the input signal EY After that, an error SY before and after the determining process is output. In addition, the baseline corrector 204 calculates the slicer error SY statistically, and then outputs the compensation signal CY accordingly.

In the method of FIG. 2, the signal EY output from the equalizer 202 and the signal SY output from the slicer all have a higher number of bits, so the compensation is quite precise. However, a front end signal BY entering the ADC 201 is not compensated, which may cause the saturation of the ADC 201. In order to avoid the saturation, an auto gain controller is used to adjust the gain of the front end signal BY that enters the ADC 201, and thus, the swing range of the signal BY becomes smaller, and the SNR is reduced.

In a communication system, whether or not the baseline wandering occurs or how severe the baseline wandering will be cannot be estimated, so during circuit designs, a designer has to consider the worst situation, i.e., killer pattern in the University of New Hampshire (UNH) certification. However, in order to successfully challenge the killer pattern, the processing capability directed to normal situations has to be designed excessively. For example, as for the circuits of FIGS. 1 and 2, the circuit of FIG. 1 uses the DAC and ADC with limited precision to adjust the DC bias of the signals, such that the signal swing range falls into the input range of the ADC to prevent the ADC saturation, and thus the signals with relatively small baseline wandering cannot be compensated precisely; in another aspect, in the circuit shown in FIG. 2, in order to prevent the saturation of the ADC, the front end signal entering the ADC is reduced, so the SNR is lowered. The two circuits are designed for special situations, but neglect the precision compensation in most normal situations.

SUMMARY OF THE INVENTION

The present invention is directed to a baseline wandering compensation circuit, which has two feedback compensation paths. One of the paths is for coarse adjustment, which adjusts a DC bias of an input signal before entering an ADC, so as to resist severe baseline wandering. The other path is for fine adjustment, which adjusts a determining level of a slicer, so as to compensate relative fine baseline wandering at any time, and to enhance an SNR.

The present invention is also directed to a method for baseline wandering compensation, applicable for both the killer pattern and the normal signal transmission quality, which has advantages of both the above two prior arts and effectively enhances the SNR of killer patterns or normal signals, without reducing the input signal, or enhancing the precision of a DAC.

As embodied and broadly described herein, the present invention provides a baseline wandering compensation circuit, which includes a DAC, a baseline compensator, an ADC, an equalizer, a slicer, and a baseline corrector. The DAC converts a first compensation signal from a digital signal to an analog signal. The baseline compensator receives an input signal, and adjusts a DC bias of the input signal with the first compensation signal that has been converted to an analog signal. The ADC converts the input signal after the DC bias adjustment to a digital signal. The equalizer eliminates a channel effect of the digitalized input signal. The slicer determines the state value corresponding to the input signal after the channel effect elimination, outputs an error of the input signal passing through the slicer, and uses a second compensation signal to adjust the determining levels of the slicer. The baseline corrector outputs the first compensation signal and the second compensation signal according to the slicer error.

In one embodiment of the baseline wandering compensation circuit, the baseline corrector includes a quantization device. The quantization device outputs a first compensation and a second compensation according to the slicer error. The first compensation signal is the first compensation or it is generated according to the first compensation, and the second compensation signal is the second compensation or it is generated according to the second compensation.

In one embodiment of the baseline wandering compensation circuit, the quantization device divides the bits of the slicer error into two segments, the first compensation is one of the segments with a higher weight, and the second compensation is the other segment with a lower weight.

In one embodiment, the baseline wandering compensation circuit further comprises an integrator for performing an integral operation on the slicer error, and outputting a result of the integral operation. The quantization device outputs the first compensation and the second compensation according to the result of the integral operation.

In one embodiment of the baseline wandering compensation circuit, the quantization device divides the bits of the result of the integral operation into two segments, the first compensation is one of the segments with a higher weight, and the second compensation is the other segment with a lower weight.

In one embodiment, the baseline wandering compensation circuit further comprises an integrator for performing an integral operation on the first compensation, and outputting a result of the integral operation as the first compensation signal.

In one embodiment, the baseline wandering compensation circuit further includes an integrator for performing an integral operation on the second compensation, and outputting a result of the integral operation as the second compensation signal.

As embodied and broadly described herein, the present invention further provides a method for baseline wandering compensation, which includes the following steps. Firstly, a first compensation signal is converted from a digital signal to an analog signal; next, the first compensation signal after the conversion is used to adjust the DC bias of the input signal; then, the input signal after the adjustment is converted from an analog signal to a digital signal; and then, the channel effect of the digitalized input signal is eliminated. Then, the state value corresponding to the input signal after the channel effect elimination is determined, an error of the above state determination is provided, and meanwhile, a second compensation signal is used to adjust the determining levels of the above state determination. In addition, the first compensation signal and the second compensation signal are generated according to the error of the state determination.

According to the preferred embodiment of the present invention, the circuit and the method for baseline wandering compensation utilize two feedback compensation paths. The first path begins from the baseline corrector to the DAC and then to the baseline compensator, which adjusts the DC bias of the input signal before entering the ADC, so as to resist severe baseline wandering. The second path begins from the baseline corrector to the slicer, which adjusts the determining level of the slicer, so as to compensate the fine baseline wandering at any time. The circuit and the method for baseline wandering compensation provided in the present invention take both killer patterns and the normal transmission signal quality into consideration, and have advantages of both the two prior arts, which can effectively enhance the SNR for the killer patterns or normal signals.

In order to make the aforementioned and other objects, features and advantages of the present invention comprehensible, preferred embodiments accompanied with figures are described in detail below.

DESCRIPTION OF EMBODIMENTS

Figure 1:
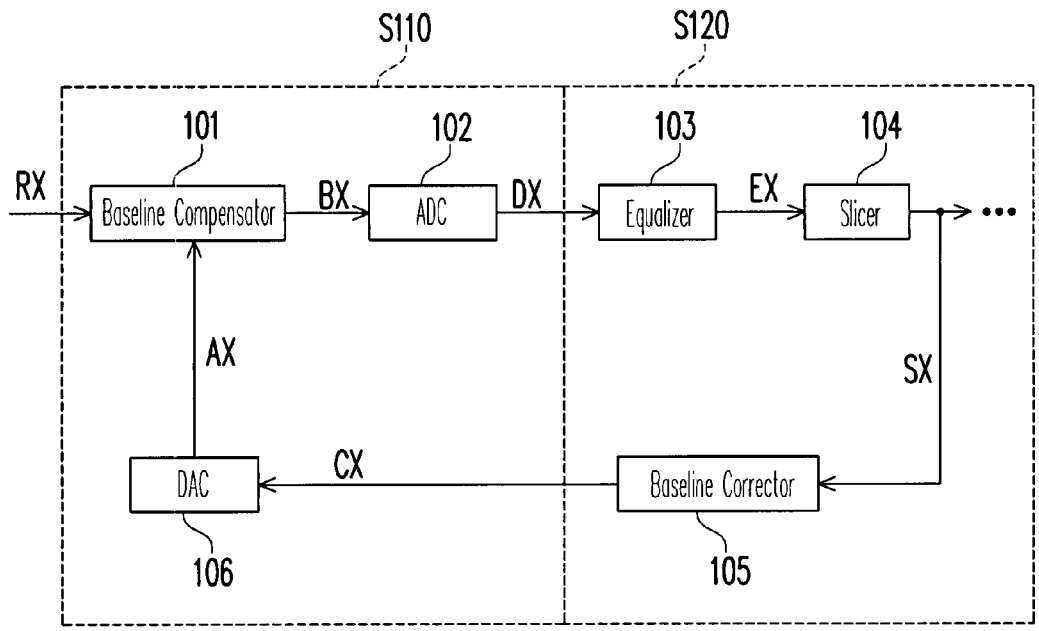
FIG. 1 shows the first baseline wandering compensation method in the conventional art.
Figure 2:
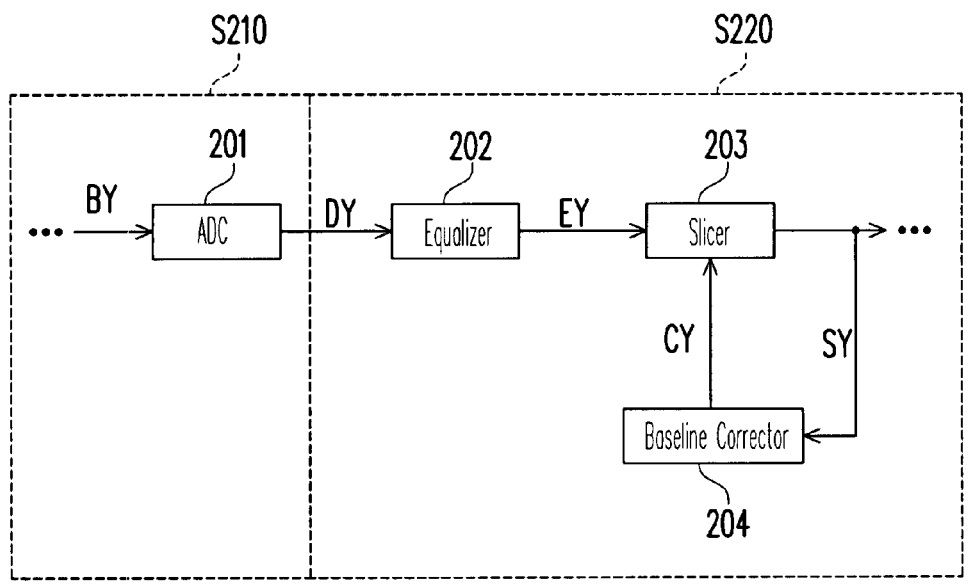
FIG. 2 shows the second baseline wandering compensation method in the conventional art.
Figure 3:
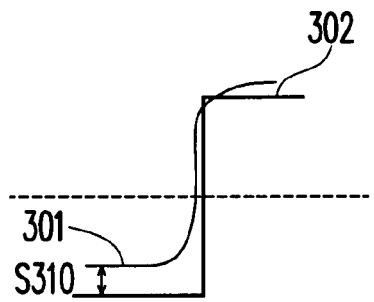
FIG. 3 shows the slicer error caused by a positive DC bias.

In this embodiment, it is assumed to be applied in a receiver of a 100M bit Ethernet, which receives input signals MLT-3 as analog signals. When an input signal is converted to a digital signal by an ADC, the channel effect of the input signal must be eliminated by an equalizer, and then, a 3-level slicer is used to determine the state value corresponding to the input signal, i.e., sampling and recovering the 3-level signal sent from a sender. FIG. 3 shows the slicer error caused by a positive DC bias. Referring to FIG. 3, if the effect of noises is ignored, theoretically, an error S310 obtained before and after state values 302 corresponding to the input signal 301 are determined by a slicer is the DC bias. As long as the error is smaller than the level difference of the slicer, i.e., two lines for dividing the three-level signal into three levels are not crossed, no decoding error will occur. However, if the DC bias exists for the input signal, or the DC bias keeps increasing due to the baseline wandering, the tolerance of the system to the noises is reduced, and even the lines for dividing the three-level signal will be crossed, which will cause decoding errors.

Figure 4:
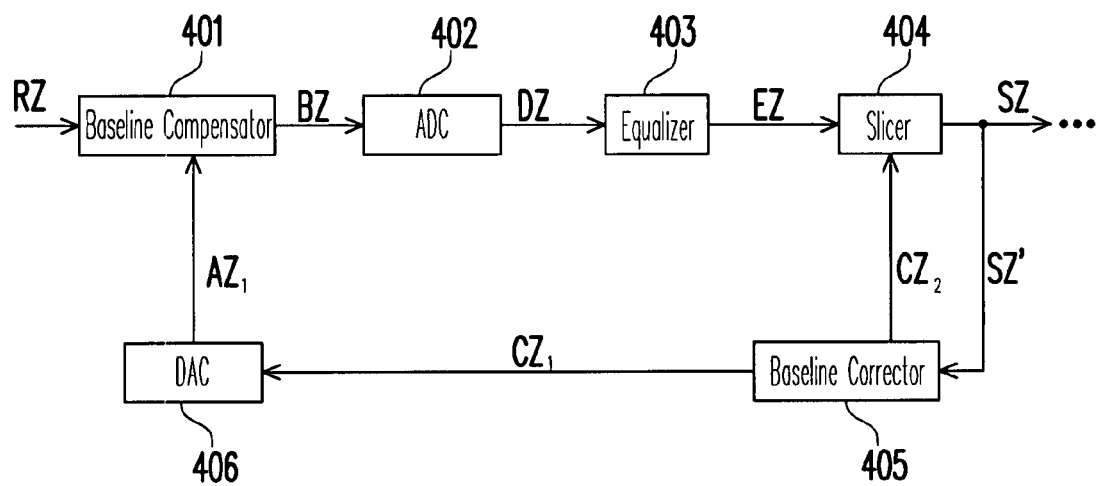
FIG. 4 is an architectural view of a baseline wandering compensation circuit according to a preferred embodiment of the present invention.

A preferred embodiment of the present invention will be illustrated below. FIG. 4 is a schematic view of a baseline wandering compensation circuit of this embodiment. Referring to FIG. 4, this circuit includes a baseline compensator 401, an ADC 402, an equalizer 403, a slicer 404, a baseline corrector 405, and a DAC 406. The DAC 406 converts a first compensation signal $CZ_1$ from a digital signal to an analog signal, and outputs a converted signal $AZ_1$. The baseline compensator 401 receives an input signal RZ, uses the signal $AZ_1$ to adjust a DC bias of the input signal RZ, and outputs an adjusted signal BZ. The ADC 402 converts the signal BZ from an analog signal to a digital signal, and outputs a digitalized signal DZ. The equalizer 403 eliminates the channel effect of the digitalized signal DZ, and outputs a signal EZ in which the channel effect has already been eliminated. The slicer 404 determines the state value corresponding to the signal EZ, outputs the state value SZ, outputs a slicer error SZ' of the state determination of the slicer 404, and uses a second compensation signal $CZ_2$ to adjust the determining levels of the above state determination. The baseline corrector 405 outputs the first compensation signal $CZ_1$ and the second compensation signal $CZ_2$ according to the slicer error SZ'.

To illustrate this embodiment in detail, it is assumed that the precision of the ADC 402 and the DAC 406 is 8 bits. Therefore, the range for the baseline compensator 401 to adjust the DC bias is −128 to 127. In addition, it is assumed that, the precision of the output signal EZ of the equalizer 403 is 14 bits.

Figure 5:
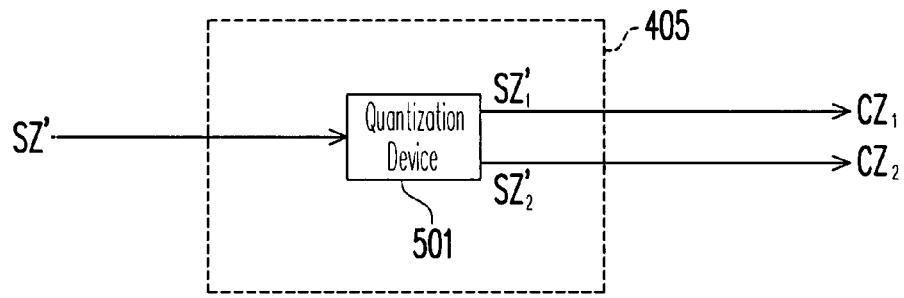
FIG. 5 is an architectural view of a baseline corrector according to a preferred embodiment of the present invention.

FIG. 5 is an architectural view of the baseline corrector 405. Referring to FIG. 5, the baseline corrector 405 in the baseline wandering compensation circuit includes a quantization device 501, which is used to output a first compensation $SZ'_1$ and a second compensation $SZ'_2$ according to the slicer error SZ'. The quantization device 501 divides the bits of the slicer error SZ' into two segments, the first compensation $SZ'_1$ is one of the segments with a higher weight, and the second compensation $SZ'_2$ is the other segment with a lower weight. In the embodiment of FIG. 5, the first compensation signal $CZ_1$ is the first compensation $SZ'_1$, and the second compensation signal $CZ_2$ is the second compensation $SZ'_2$. To match with the above assumption in this embodiment, as the output signal EZ of the equalizer 403 has the precision of 14 bits, the slicer error SZ' is a 14-bit digital signal. The first compensation signal $CZ_1$ (i.e., the first compensation $SZ'_1$) is output to the DAC 406. In view of matching with the precision of the DAC 406 as 8 bits, the first compensation SZ' is 8 most significant bits of the slicer error SZ', and the first compensation signal $CZ_1$ is fed back to the baseline compensator 401 by means of coarse adjustment, so as to adjust the DC bias of the baseline compensator 401. The second compensation signal $CZ_2$ (i.e., the second compensation $SZ'_2$) is 6 least significant bits of the slicer error SZ', and the second compensation signal $CZ_2$ is fed back to the slicer 404 by means of fine adjustment, so as to adjust the determining level of the slicer 404.

If the signal EZ output from the equalizer 403 bounces up and down due to containing DC components, and the determining level of the slicer 404 is also made to bounce up and down accordingly, the DC bias will not be observed. The number of bits of the signal EZ output by the equalizer 403 to the slicer 404, i.e., the precision, is larger than, or even over two times larger than, the precision of the DAC 406 and the ADC 402. Therefore, if the error SZ' of the slicer 404 is corresponding to the minimum unit of the DAC 406, some remainders less than the minimum unit are definitely limited by the precision, and thus cannot be precisely presented. However, in fact, such error can be observed by a digital terminal. In order to achieve the maximum performance of the system and hardware, the most cost effective solution is to directly adjust the determining level of the slicer 404, so as to compensate the baseline wandering smaller than the minimum unit of the DAC 406.

Figure 6:
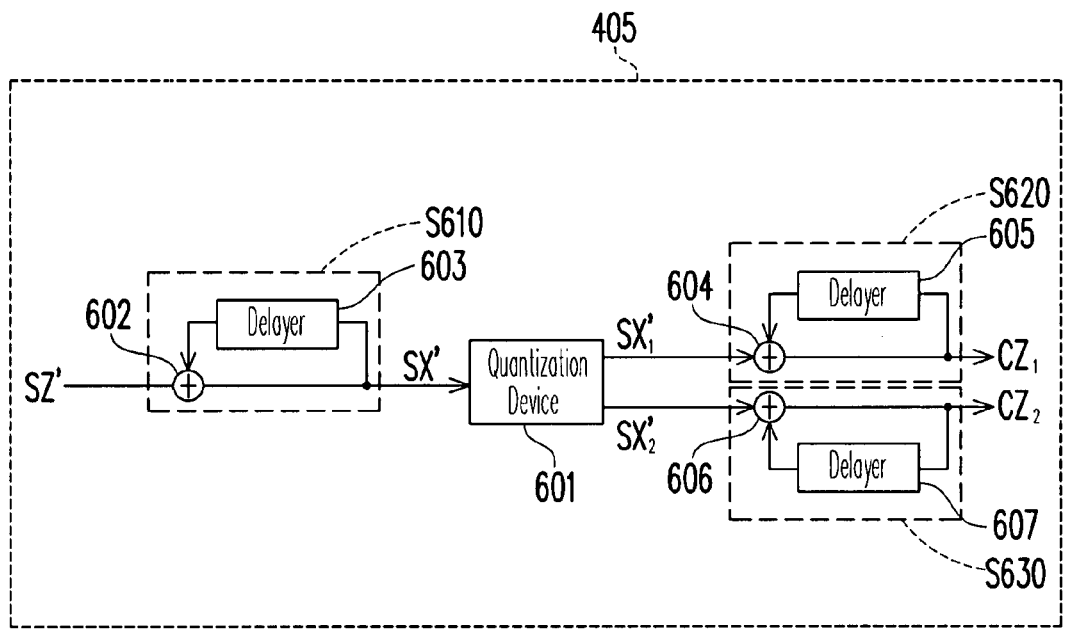
FIG. 6 is an architectural view of a baseline corrector according to another preferred embodiment of the present invention.

As shown in FIG. 4, to illustrate another preferred embodiment of the present invention in detail, it is assumed that, the precision of the ADC 402 is 8 bits, and the precision of the DAC 406 is 5 bits. Therefore, the range for the baseline compensator 401 to adjust the DC bias is −16 to 15. In addition, it is assumed that, the precision of the output signal EZ of the equalizer 403 is still 14 bits. FIG. 6 is an architectural view of the baseline corrector 405 according to another embodiment of the present invention. Referring to FIG. 6, the baseline corrector 405 in the baseline wandering compensation circuit includes integrators S610, S620, and S630, and a quantization device 601.

The integrator S610 includes an adder 602 and a delayer 603. The adder 602 adds the slicer error SZ' and an output of the delayer 603, and then outputs the adding result as a signal SX'. Meanwhile, the delayer 603 delays the output SX' of the adder 602 for a predetermined period of time, and then outputs it to the adder 602. The function of the entire integrator S610 is to accumulate samples of the slicer error SZ' for a period of time, i.e., to perform an integral operation. The quantization device 601 outputs the first compensation $SX'_1$ and the second compensation $SX'_2$ according to the signal SX'. The integrator S620 includes an adder 604 and a delayer 605. The adder 604 adds the first compensation $SX'_1$ and an output of the delayer 605, and then outputs the adding result as the first compensation signal $CZ_1$, and meanwhile, the delayer 605 delays the first compensation signal $CZ_1$ for a certain period of time and then outputs it to the adder 604. The function of the entire integrator S620 is to accumulate samples of the first compensation $SX'_1$ for a period of time, i.e., to perform the integral operation. The integrator S630 includes an adder 606 and a delayer 607. The adder 606 adds the second compensation $SX'_2$ and an output of the delayer 607, and then outputs the adding result as the second compensation signal $CZ_2$, and meanwhile, the delayer 607 delays the second compensation signal $CZ_2$ for a certain period of time, and then outputs it to the adder 606. The function of the entire integrator S630 is to accumulate samples of the second compensation $SX'_2$ for a period of time, i.e., to perform the integral operation. The quantization device 601 in the baseline corrector 405 divides the bits of the signal SX' into two segments, the first compensation $SX'_1$ is one of the segments with a higher weight, and the second compensation $SX'_2$ is the other segment with a lower weight. In order to match with the above assumption in another preferred embodiment of the present invention, as the first compensation signal $CZ_1$ output to the DAC 406 must match with the precision of the DAC 406 as 5 bits, the first compensation $SX'_1$ is 5 most significant bits of the signal SX', and the first compensation signal $CZ_1$ is fed back to the baseline compensator 401 by means of coarse adjustment, so as to adjust the DC bias of the baseline compensator 401. The second compensation $SX'_2$ is 9 least significant bits of the signal SX', and the second compensation signal $CZ_2$ is fed back to the slicer 404 by means of fine adjustment, so as to adjust the determining level of the slicer 404.

In the preferred embodiment of FIG. 6, the integrators S620 and S630 in the baseline corrector 405 are designed to find out the real wandering trend of the DC bias, instead of the error of signal interference, by means of accumulating statistically for a long time. Therefore, the integrators S620 and S630 perform the integral operation to the first compensation $SX'_1$ and the second compensation $SX'_2$ respectively, and then output results of the integral operations respectively as the first compensation signal $CZ_1$ and the second compensation signal $CZ_2$, and thus achieving a more stable and precise compensation. In addition, if the baseline wandering is very slow, i.e., the DC bias and the slicer error SZ' are changed slightly and slowly, it may cannot be accumulated to the first compensation $SX'_1$ at the coarse adjustment terminal, but cause an overflow of the second compensation $SX'_2$ at the fine adjustment terminal. Therefore, before providing the signal SX' to the quantization device 601, the integrator S610 performs the integral operation to the slicer error SZ' first, and then, transmits the result of the integral operation SX' to the quantization device 601. Then, the bits of the signal SX' are divided into two segments, so as to avoid the overflow at the fine adjustment control terminal.

Figure 7:
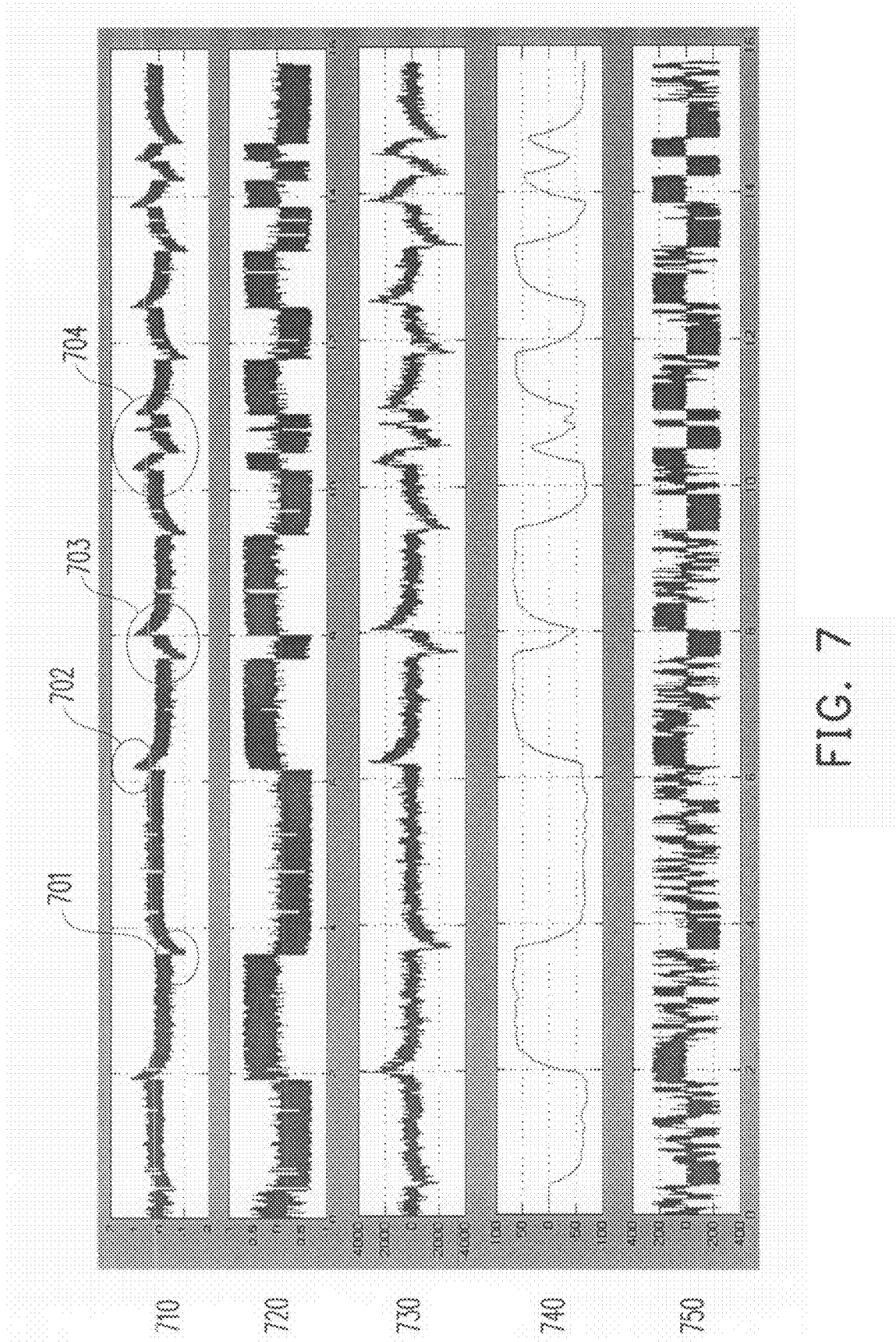
FIG. 7 is a schematic waveform chart of signals in the simulation result of the baseline wandering compensation circuit according to an embodiment of the present invention.

FIG. 7 shows a schematic waveform chart of simulation results on killer patterns of the UNH certification for a baseline wandering compensation circuit according to an embodiment of the present invention. Referring to FIG. 7, the signal transmission channel is a cable (UTP CAT-5) with a length of 120 m, and the numeral 710 indicates a signal waveform obtained after passing through a transformer at the receiver, and 701-704 indicate the ADC saturation phenomena caused by the baseline wandering and polarity changing. The numeral 720 indicates the waveform of the output signal obtained after being compensated by a baseline compensator (e.g., 401 in FIG. 4). The numeral 730 indicates the error of the signal before and after passing through the slicer, and the bits of the slicer error are divided into two segments by a baseline corrector, so as to generate compensation signals required by two feedback compensation paths. The numeral 740 indicates the waveform of the first compensation signal for the coarse adjustment, which is used to adjust the DC bias of the input signal before entering the ADC. The numeral 750 indicates the waveform of the second compensation signal for the fine adjustment, which is used to adjust the determining level of the slicer.

The present invention is not limited to the above embodiments. Persons of ordinary skill in the art can adopt different designs depending upon the particular requirements, without departing from the operating principle of the circuit and method for baseline wandering compensation of the present invention. The two baseline wandering compensation paths of the present invention are utilized simultaneously. The baseline corrector is used to divide the bits of the signal for the slicer error into two segments. According to precisions of the DAC and the ADC, the DC bias of the input signal passing through the baseline compensator is adjusted by means of coarse adjustment, such that the swing range of the input signal falls within the input range of the ADC, and thus, the saturation of the ADC can be avoided without reducing the input signal. Moreover, the slicer error lower than the precision of the DAC is transmitted to the slicer by means of fine adjustment, so as to adjust the determining level of the slicer, and thus, a higher compensation precision is achieved, and the SNR is enhanced.

It will be apparent to persons of ordinary art in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A baseline wandering compensation circuit, comprising:
   a digital-to-analog converter (DAC), for converting a first compensation signal from a digital signal to an analog signal, and outputting the converted first compensation signal;
   a baseline compensator, for receiving an input signal, using the converted first compensation signal to adjust a direct current (DC) bias of the input signal, and outputting the adjusted input signal;
   an analog-to-digital converter (ADC), for converting the adjusted input signal from an analog signal to a digital signal, and then outputting the digitalized input signal;
   an equalizer, for eliminating the channel effect of the digitalized input signal, and outputting the input signal after the channel effect elimination;
   a slicer, for determining the state value corresponding to the input signal after the channel effect elimination, outputting a slicer error of the state determination, and using a second compensation signal to adjust the determining levels of the state determination;
   a baseline corrector, for outputting the first compensation signal and the second compensation signal according to the slicer error, the baseline corrector comprising:
   a quantization device, for outputting a first compensation and a second compensation according to the slicer error, wherein the first compensation signal is the first compensation or is generated according to the first compensation, and the second compensation signal is the second compensation or is generated according to the second compensation.

2. The baseline wandering compensation circuit as claimed in claim 1, wherein the quantization device divides the bits of the slicer error into two segments, the first compensation is one of the segments with a higher weight, and the second compensation is the other one of the segments with a lower weight.

3. The baseline wandering compensation circuit as claimed in claim 1, further comprising:
   an integrator, for performing an integral operation to the slicer error, outputting a result of the integral operation, wherein the quantization device outputs the first compensation and the second compensation according to the result of the integral operation.

4. The baseline wandering compensation circuit as claimed in claim 3, wherein the quantization device divides the bits of the result of the integral operation into two segments, the first compensation is one of the segments with a higher weight, and the second compensation is the other one of the segments with a lower weight.

5. The baseline wandering compensation circuit as claimed in claim 3, wherein the integrator comprises:
   a delayer; and
   an adder;
   wherein the adder adds the slicer error and an output of the delayer, outputs the adding result as an output of the integrator, and the delayer delays the output of the adder for a predetermined period of time and then outputs to the adder.

6. The baseline wandering compensation circuit as claimed in claim 1, further comprising:
   an integrator, for performing an integral operation to the first compensation, and outputting a result of the integral operation as the first compensation signal.

7. The baseline wandering compensation circuit as claimed in claim 6, wherein the integrator comprises:
   a delayer; and
   an adder;
   wherein the adder adds the first compensation and an output of the delayer, outputs the adding result as the first compensation signal, and the delayer delays the first compensation signal for a predetermined period of time and then outputs to the adder.

8. The baseline wandering compensation circuit as claimed in claim 1, further comprising:
   an integrator, for performing an integral operation to the second compensation, and outputting a result of the integral operation as the second compensation signal.

9. The baseline wandering compensation circuit as claimed in claim 8, wherein the integrator comprises:
   a delayer; and
   an adder;
   wherein the adder adds the second compensation and an output of the delayer, outputs the adding result as the second compensation signal, and the delayer delays the second compensation signal for a predetermined period of time and then outputs to the adder.

10. A method for baseline wandering compensation, comprising:
    converting a first compensation signal from a digital signal to an analog signal;
    using the converted first compensation signal to adjust a DC bias of an input signal;
    converting the adjusted input signal from an analog signal to a digital signal;

eliminating a channel effect of the digitalized input signal;
determining the state value corresponding to the input signal after the channel effect elimination;
providing an error of the state determination;
using a second compensation signal to adjust the determining levels of the state determination;
generating a first compensation and a second compensation according to the error; and
generating the first compensation signal and the second compensation signal respectively according to the first compensation and the second compensation, wherein the first compensation signal is the first compensation or is generated according to the first compensation, and the second compensation signal is the second compensation or is generated according to the second compensation.

11. The method for baseline wandering compensation as claimed in claim 10, wherein the bits of the error are divided into two segments, the first compensation is one of the segments with a higher weight, and the second compensation is the other one of the segments with a lower weight.

12. The method for baseline wandering compensation as claimed in claim 10, wherein the step of generating the first compensation and the second compensation comprises:
    performing an integral operation to the error; and
    generating the first compensation and the second compensation according to a result of the integral operation.

13. The method for baseline wandering compensation as claimed in claim 12, wherein the bits of the result of the integral operation are divided into two segments, the first compensation is one of the segments with a higher weight, and the second compensation is the other one of the segments with a lower weight.

14. The method for baseline wandering compensation as claimed in claim 12, wherein the step of performing an integral operation to the error comprises:
    adding the error and a delayed signal, and outputting the adding result as the result of the integral operation; and
    delaying the result of the integral operation for a predetermined period of time to act as the delayed signal.

15. The method for baseline wandering compensation as claimed in claim 10, wherein the step of generating the first compensation signal according to the first compensation comprises:
    performing an integral operation to the first compensation; and
    taking a result of the integral operation as the first compensation signal.

16. The method for baseline wandering compensation as claimed in claim 15, wherein the step of performing an integral operation to the first compensation comprises:
    adding the first compensation and a delayed signal;
    providing the adding result as the first compensation signal; and
    delaying the first compensation signal for a predetermined period of time to act as the delayed signal.

17. The method for baseline wandering compensation as claimed in claim 10, wherein the step of generating the second compensation signal according to the second compensation comprises:
    performing an integral operation to the second compensation; and
    taking a result of the integral operation as the second compensation signal.

18. The method for baseline wandering compensation as claimed in claim 17, wherein the step of performing an integral operation to the second compensation comprises:
    adding the second compensation and a delayed signal;
    providing the adding result as the second compensation signal; and
    delaying the second compensation signal for a predetermined period of time to act as the delayed signal.

* * * * *